United States Patent
Chen et al.

(10) Patent No.: US 7,661,067 B2
(45) Date of Patent: Feb. 9, 2010

(54) METHOD FOR PROVIDING QUICK RESPONSES IN INSTANT MESSAGING CONVERSATIONS

(75) Inventors: Yen-Fu Chen, Austin, TX (US); John Hans Handy-Bosma, Cedar Park, TX (US); Mei Yang Selvage, Pocatello, ID (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 672 days.

(21) Appl. No.: 11/358,754

(22) Filed: Feb. 21, 2006

(65) Prior Publication Data

US 2007/0198646 A1   Aug. 23, 2007

(51) Int. Cl.
G06F 3/00 (2006.01)
G06F 3/048 (2006.01)
G06F 15/16 (2006.01)

(52) U.S. Cl. .............. 715/752; 715/784; 715/780; 715/808; 715/753; 715/758; 715/759; 709/207; 709/206

(58) Field of Classification Search .............. 715/784, 715/780, 808, 752, 753, 758, 759; 709/207, 709/206
See application file for complete search history.

(56) References Cited

U.S. PATENT DOCUMENTS

| | | | |
|---|---|---|---|
| 5,977,970 A * | 11/1999 | Amro et al. ............ 715/857 |
| 6,484,196 B1 * | 11/2002 | Maurille ................ 709/206 |
| 6,630,944 B1 | 10/2003 | Kakuta et al. | |
| 6,792,448 B1 * | 9/2004 | Smith ................... 709/204 |
| 7,412,044 B2 * | 8/2008 | Chavez et al. ........ 379/201.01 |
| 2003/0134678 A1 | 7/2003 | Tanaka | |
| 2003/0208545 A1 | 11/2003 | Eaton et al. | |
| 2004/0015548 A1 | 1/2004 | Lee | |
| 2004/0162877 A1 | 8/2004 | Van Dok et al. | |
| 2005/0132012 A1 | 6/2005 | Muller et al. | |
| 2005/0198124 A1 | 9/2005 | McCarthy | |
| 2007/0033250 A1 * | 2/2007 | Levin et al. ............ 709/204 |
| 2008/0092063 A1 | 4/2008 | Canfield et al. | |
| 2008/0228894 A1 | 9/2008 | Chen et al. | |

OTHER PUBLICATIONS

U.S. Appl. No. 11/358,748, filed Feb. 21, 2006, Chen et al.
U.S. Appl. No. 11/338,992, filed Jan. 25, 2006, Chen et al.

* cited by examiner

*Primary Examiner*—Tadesse Hailu
*Assistant Examiner*—Nicholas S Ulrich
(74) *Attorney, Agent, or Firm*—Yee & Associates, P.C.; William H. Steinberg

(57) ABSTRACT

A computer implemented method, data processing system, and computer program product for allowing a user to quickly and directly responds to a turn in an instant messaging conversation. One or more instant messaging chat conversations are displayed to a user. User input is received selecting a turn in the one of more instant messaging chat conversations. Responsive to receiving the user input selecting a turn, a user input region is provided to the user, wherein the user input region is used to receive an instant message from the user. Upon the user entering an instant message into the user input region, the message is sent to a set of participants in the instant messaging chat conversation.

17 Claims, 11 Drawing Sheets

METHOD FOR PROVIDING QUICK RESPONSES IN INSTANT MESSAGING CONVERSATIONS

BACKGROUND OF THE INVENTION

1. Field of the Invention

The present invention relates generally to an improved data processing system for processing and displaying messages. Still more particularly, the present invention provides a computer implemented method, data processing system, and computer program product for allowing a user to quickly and directly provides a response in an instant messaging conversation.

2. Description of the Related Art

Instant messaging (IM) is an online chat medium, allowing users to communicate with each other and to collaborate in real-time over a network data processing system. Instant messaging is commonly used over the Internet. Instant messaging applications monitor and report the status of users that have established each other as online contacts. This information is typically presented to a user in a window. Instant messaging applications also are often used by users conducting business. By utilizing instant messaging, business users can view each other's availability and initiate a text conversation with colleagues or customers when a desired contact becomes available. Millions of users communicate using instant messaging systems every day. With instant messaging becoming an important part of both personal and business communications, functionality and usability enhancements are important to the continued success of this type of communication tool.

Users of instant messaging clients often maintain multiple instant message conversations simultaneously. It is not unusual for users to have ten or more instant message conversations ongoing at the same time. A user may converse both in individual and group contexts.

Due to the design of current instant messaging clients, tasks such as monitoring a user's conversations, switching among the conversations, and coordinating instant messaging windows with other application windows often becomes problematic. Typically, instant messaging clients employ native operating system windowing and task switching mechanisms. Both of these approaches in current instant messaging clients are problematic for the following reasons:

1. Task Bar or equivalent. Instant messaging clients such as AOL® Instant Messenger™, a product of America Online, Inc., Lotus® Sametime®, a product of International Business Machines Corporation, and MSN Messenger®, a product of Microsoft Corporation, use a windows task bar to enable switching between conversations. Switching between conversations in this manner is an unnecessarily laborious and error-prone process. Consider, for example, a user who has five or more chats grouped in the windows task bar. When a new message is received, the task bar may be highlighted. Users must click on the task bar, identify the chats where new turns have taken place (often with a highlighted icon or user name), and then navigate through the chat windows serially in order to read new messages, to decide whether to respond, and to draft a response. The above steps must be repeated for every chat window that has received a new message. New messages often come in at the same time the user is reading and responding. A user must return to the task bar repeatedly, without an indication of the number of new messages within a chat, who has sent the messages, or the importance or relevance of the incoming message to the user's ongoing work. This process is clearly a disruptive and ineffective means of managing communication. Consider a second example in which a user has five chats open separately on the task bar. The user must click on each of these chats serially to pop up the chat window in order to see the changes. The task bar often must overflow to the next row or expand the task bar. Because of these hidden windows, users often do not know that they have received new messages.

2. Automatic pop-up of chat windows. For many users, this alternative to using the task bar to switch among chat windows tends to be even more disruptive, since the automatic pop-up of chat windows interrupt the user's current work. Messages pop up (e.g., are brought to the forefront of the user's desktop) without regard to the messages' importance and a user must use a pointing device, tabs, or an equivalent to minimize the window. Often the same window will pop up again as soon as it is minimized, because a user on the other end of the conversation has entered a new message in the window. Pop-up windows also tend to capture inadvertent user input, with messages sent to the wrong person. These reasons mentioned are among the many reasons auto pop-ups are not chosen by the vast majority of users. For many, pop-up windows are regarded as an undesirable nuisance.

Thus, it would be advantageous to have an improved mechanism for informing users of incoming messages. It would further be advantageous to allow users to quickly monitor and switch among chat conversations in an unobtrusive fashion, as well as allow users to select the chats the user wants to respond to and the chats to monitor.

SUMMARY OF THE INVENTION

Embodiments of the present invention provide a mechanism for allowing a user to quickly and directly respond to a turn in an instant messaging conversation. One or more instant messaging chat conversations are displayed to a user. User input is received selecting a turn in the one of more instant messaging chat conversations. Responsive to receiving the user input selecting a turn, a user input region is provided to the user, wherein the user input region is used to receive an instant message from the user. Upon the user entering an instant message into the user input region, the message is sent to one or more participants in the instant messaging chat conversation.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
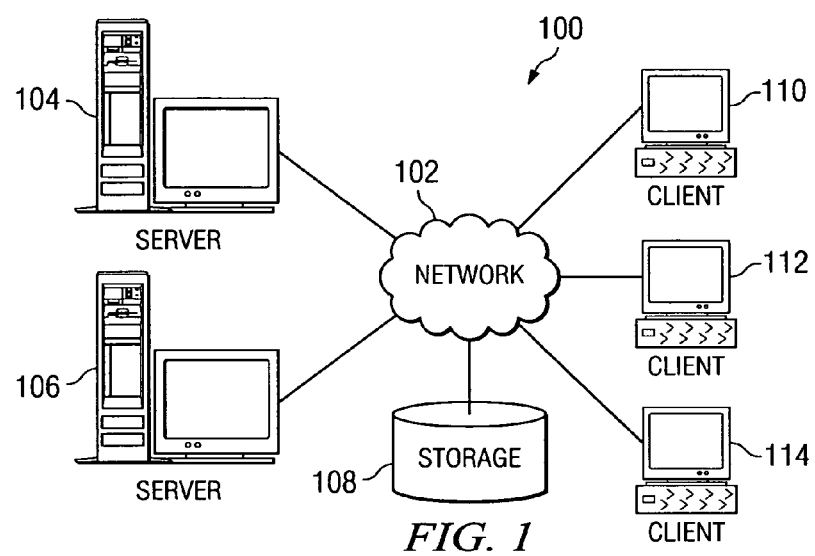
FIG. 1 depicts a representation of a network of data processing systems in which the present invention may be implemented.
Figure 2:
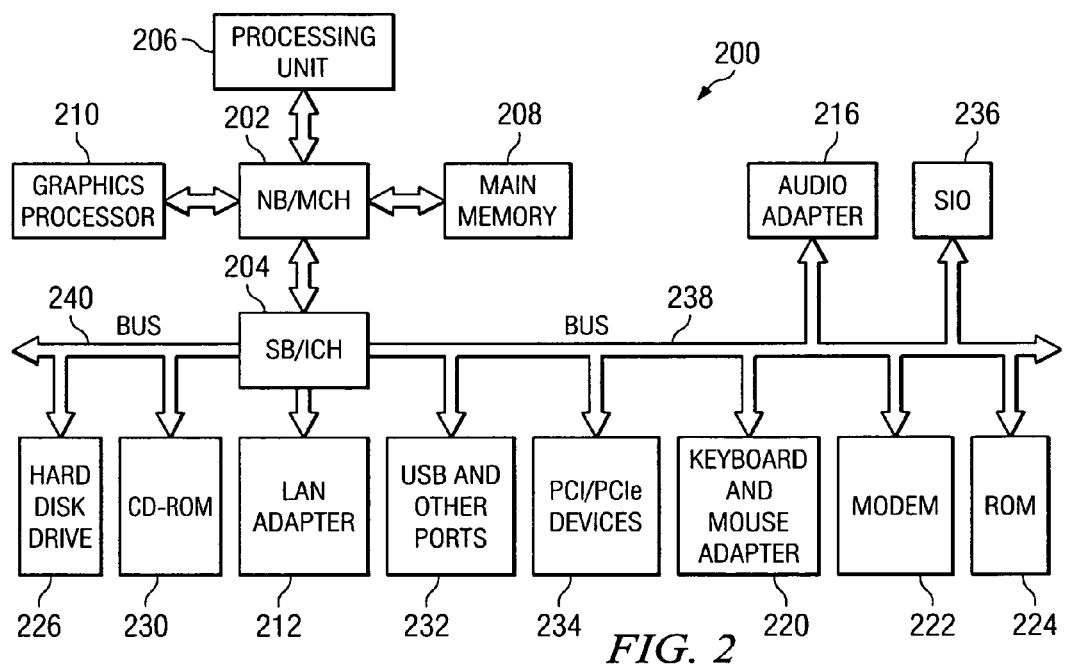
FIG. 2 is a block diagram illustrating a data processing system in which the present invention may be implemented.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, ROM 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
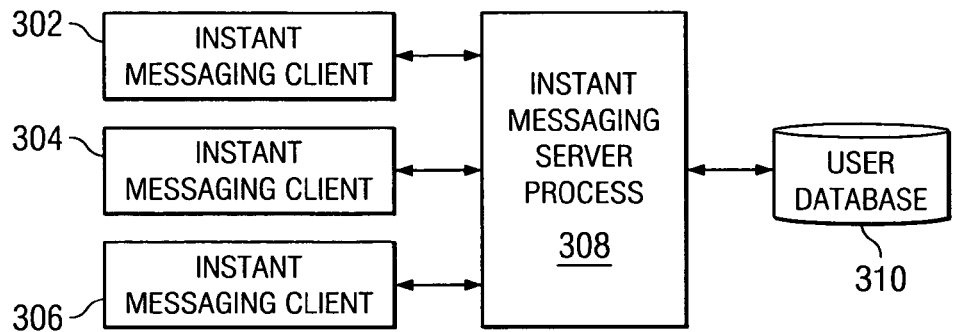
FIG. 3 is a block diagram illustrating components used in managing messages in accordance with an illustrative embodiment of the present invention.

Turning now to FIG. 3, a block diagram illustrating components used in an instant messaging system in accordance with a preferred embodiment of the present invention is shown. In this illustrative example, a user at instant messaging client 302 may send or exchange messages with other users at instant messaging clients 304 and 306. These instant messaging clients may be executing on a data processing system, such as data processing system 200 in FIG. 2. The exchange of messages in these examples is facilitated through instant messaging server process 308. This process allows for users to find other users within the instant messaging system as well as aid in the exchange of messages between different users.

Depending on the particular instant messaging system, instant messaging server process 308 may only be involved in providing an indication of when particular users are online and for establishing initial contacts while users contacting users already on a buddy list may contact those users directly after seeing that a particular user is online. Instant messaging server process 308 may be located on a server, such as servers 104 or 106 in FIG. 1.

In these examples, the different users registered to the instant messaging system are stored in user database 310. This user database provides information needed to search for and find other users as well as contact users when they are online.

Figure 4:
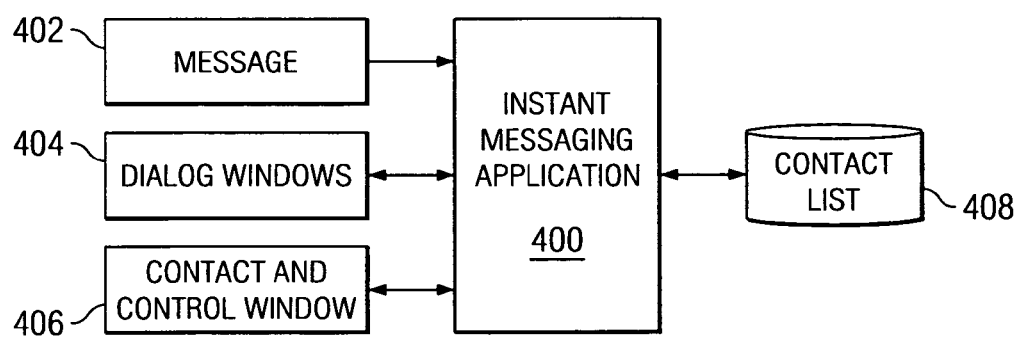
FIG. 4 is a diagram illustrating an instant messaging client in accordance with an illustrative embodiment of the present invention.

Turning next to FIG. 4, a diagram illustrating an instant messaging client is depicted in accordance with a preferred embodiment of the present invention. The components illustrated in FIG. 4 may be found in an instant messaging client, such as instant messaging clients 302, 304, or 306 in FIG. 3. These components may be implemented in a data processing system, such as data processing system 200 in FIG. 2.

In the illustrative example, instant messaging application 400 processes messages, such as message 402, received from users located on remote data processing systems. As messages are received, these messages are presented in dialog windows 404. Additionally, dialog windows 404 provide an interface for a user to input text to send messages to other users.

Contact and control window 406 is presented by instant messaging application 400 to provide the user with a list of user names, as well as other information. Contact and control window 406 also provides an interface to allow a user to set different preferences. For example, the user may set passwords required to access different names used in instant messaging sessions.

Also, a user may employ contact and control window 406 to set other preferences, such as colors and fonts used in instant messaging application 400. These preferences also may include whether a picture is to be sent when a session is initiated with another user. Depending on the implementation, the preference may be set to allow a user who receives messages to retrieve images of the senders from a remote database or a local cache.

Further, a list of names presented by contact and control window 406 are stored in contact list 408 in these examples. Additional user or screen names may be added to or deleted from contact list 408. This contact list is employed in presenting the list of names within contact and control window 406.

The mechanism of the present invention provides a "scrolling" window comprising an aggregate view of instant messaging chats. The scrolling window of the present invention provides users with the ability to configure various elements that will be displayed in the chat window. With the mechanism of the present invention, users may be informed of incoming messages in an unobtrusive manner. A user is provided with the ability to monitor the ongoing chat conversations and quickly switch among the conversations as needed. The user is also able to quickly and easily respond to those instant messages selected by the user, with minimal impact on the users' other activities.

In particular, the mechanism of the present invention provides a scrolling window comprising an aggregate view of instant messaging chats. In one illustrative embodiment, the user's instant messaging window comprises a main chat window and a scrolling window docked together, as will be shown and described further in FIGS. 5A-5D below. A user's main chat window is normally the area in which the user reads and types in information for a conversation in which the user is actively participating. The docked scrolling window allows the user to scroll through turns (bottom to top or vice-versa) in all of the monitored conversations. A turn is a complete message from a participant in a conversation. Users are also allowed to limit the contents displayed in the scrolling window to selected turns, based on configuration choices the user has made before or during conversations. In other words, the user may configure the scrolling window to show the contents of some or all chats, instant messages from some or all users across all conversations, instant messages from some or all users across selected conversations, instant messages pertaining to some or all instant messaging topics, or any combination of the above.

The scrolling window of the present invention allows a user to monitor conversations that are of key importance, without having to engage the taskbar for each message received. Without engaging in any action, the user is able to gauge the activity level, importance, or relevance of key conversations, merely by looking at how much is being said, who is saying it, what the topics are, and what is being said, among other factors. Thus, the scrolling chat window provides key advantages over the current task bar switching approach, in which the users never know what they are going to get, and which require users to engage in an inordinate number of repetitive steps just to manage multiple conversations and switch among people they are talking to.

The scrolling chat concept is similar to an actual conversation in a room full of standing participants, in that one can easily change conversations simply by turning one's head or moving to a different group. But it has an advantage over "real world" conversation in that it takes advantage of the computing power and user interfaces. A user may "listen in" on multiple conversations, which is an activity not easily performed in normal conversation. By way of analogy, consider the example of a person in a room full of people during a networking session at a professional conference. The current task bar switching approach would be similar to informing a person that someone wants to talk with them, then requiring the person to go outside and run up and down a flight of stairs several times in order to change conversations, all without the person knowing who wants to talk to them. The pop-up window approach would be like having a random number of people at the event talking directly to the person. Each of the existing approaches is clearly less desirable than allowing the user to choose whether to scroll all or some of the chats, and go to the task bar as needed.

The mechanism of the present invention also allows for switching among conversations from the docked scrolling window, while incorporating navigation controls, such as forward/back, history, and chat list navigation into the main chat window. For instance, while the user is scrolling through chats, the user may notice certain topics or turns to which the user wants to reply. Rather than going to the task bar, the user is able to switch directly to that conversation by clicking on that turn (or on a hotspot or similar device linked to that turn). In one embodiment, the point of focus in normal operations may be placed in the main chat window, with the insertion point being the text entry window typically at the bottom of an instant messaging client. When the user clicks on a turn, the conversation comprising the turn loads into the main chat window.

In another embodiment, the user may select a particular chat conversation and send a quick response to the conversation. This quick response may be created via separate user input region, such as opening a "mini-window" directly over the turn, so that the user does not have to move to the main chat window in order to type a quick message. The user input region may comprise a popup window or a designated region of an existing window for receiving text from the user. In this embodiment, the chat conversation selected by the user is not loaded into the main chat window. Rather, the mini-window pops up over the turn the user has selected, and keyboard focus is placed in the mini-window. The user enters text into the mini-window, and sends the text to the participants of the chat conversation. The text may be sent by selecting a "send" button in the mini-window or using appropriate keystrokes to send the text. Thus, the mini-window enables a user to send a quick response to a chat turn without loading the entire chat conversation into the main chat window. A user may open a mini-window to response to a selected turn in the scrolling chat window or the main chat window. The mini-window may also be used to initiate a private message or a separate conversation. The private or separate message may be sent to the participant of the turn selected by the user, rather than sending the private or separate message to all participants in the particular chat conversation. If both embodiments are employed by the instant messaging system, the user may click on an option or use appropriate keystrokes when the user selects a particular chat conversation to distinguish whether the user wants to open a mini-window to quickly respond to a chat conversation, or to load a chat conversation in the main chat window.

Aspects of the present invention also comprise a mechanism for placing responses to particular chat turn in context. A user may have multiple instant messaging conversations ongoing at once, and these conversations may be lengthy. When a user responds to a particular turn in a chat conversation, other turns in the conversation may have been sent prior to the time the user sends a response to the turn. Consider, for example, the following conversation between user A and user B:

User A: Tom wants to know if you can prepare the financial spreadsheets for the meeting and have them ready by 9 am tomorrow.
User A: Do you want to go to lunch now?
User B: Sure.

In this situation, it can be confusing knowing to which turn the user B's response is directed. The mechanism of the present invention allows users to associate an instant messaging chat response to a turn in a conversation. In this manner, a user's response is put into context in order to reduce miscommunication, such as the example shown above. The mechanism of the present invention provides a device that indicates an in-context response has been made to a turn in the conversation. The content of the in-context response may also be shown in the main conversation display area in a normal manner, just like any other turn in the conversation would be shown. The in-context response device is provided to allow a user, if confused, to clarify to which turn another user's response applies. The in-context response is linked to a particular turn in a chat conversation, and a visual cue, such as a callout box or sticky note, is provided to show that an in-context response has been made.

Figure 5A:
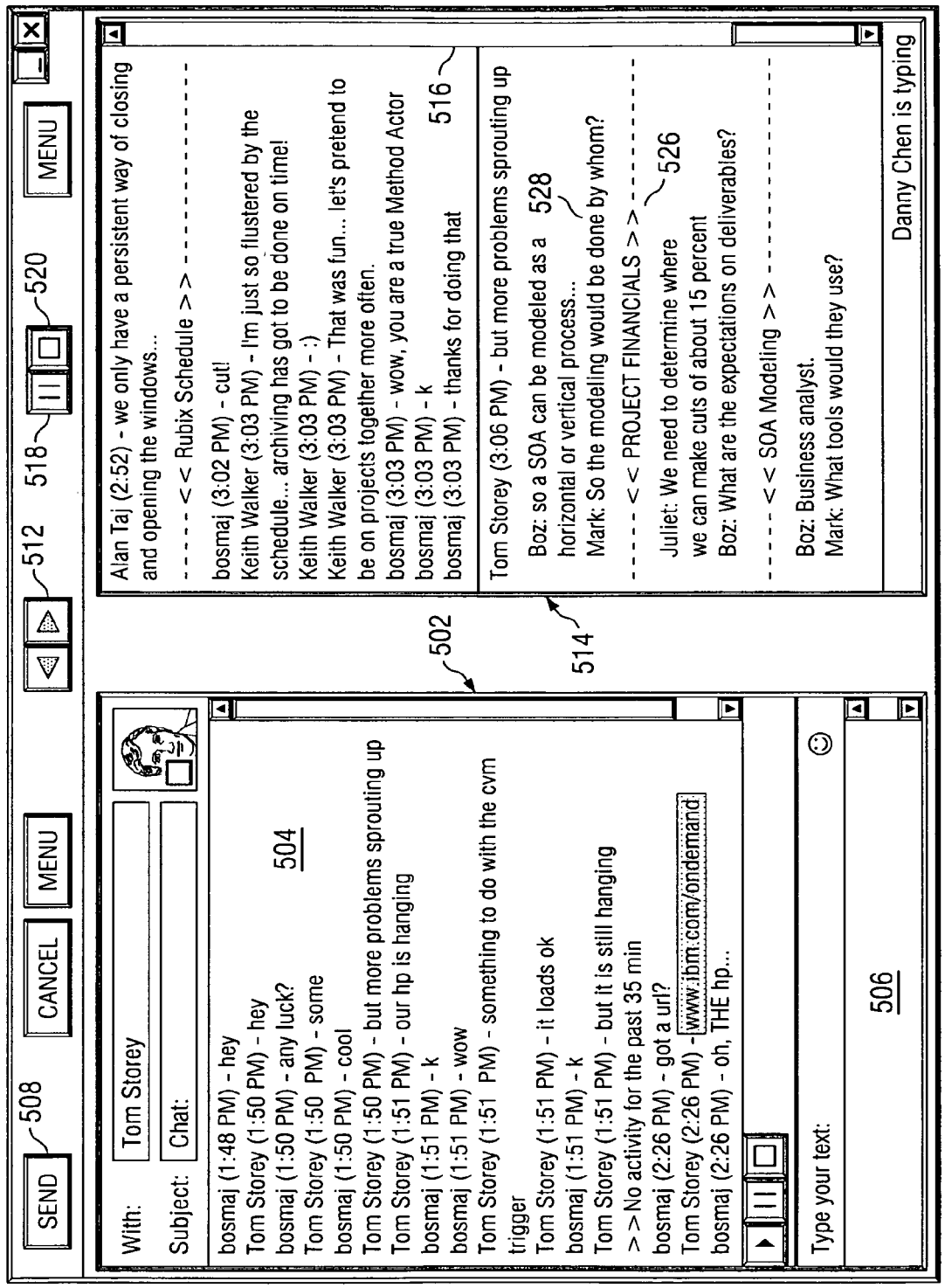
FIGS. 5A-5D are exemplary scrolling chat windows in accordance with the illustrative embodiments of the present invention.
Figure 5B:
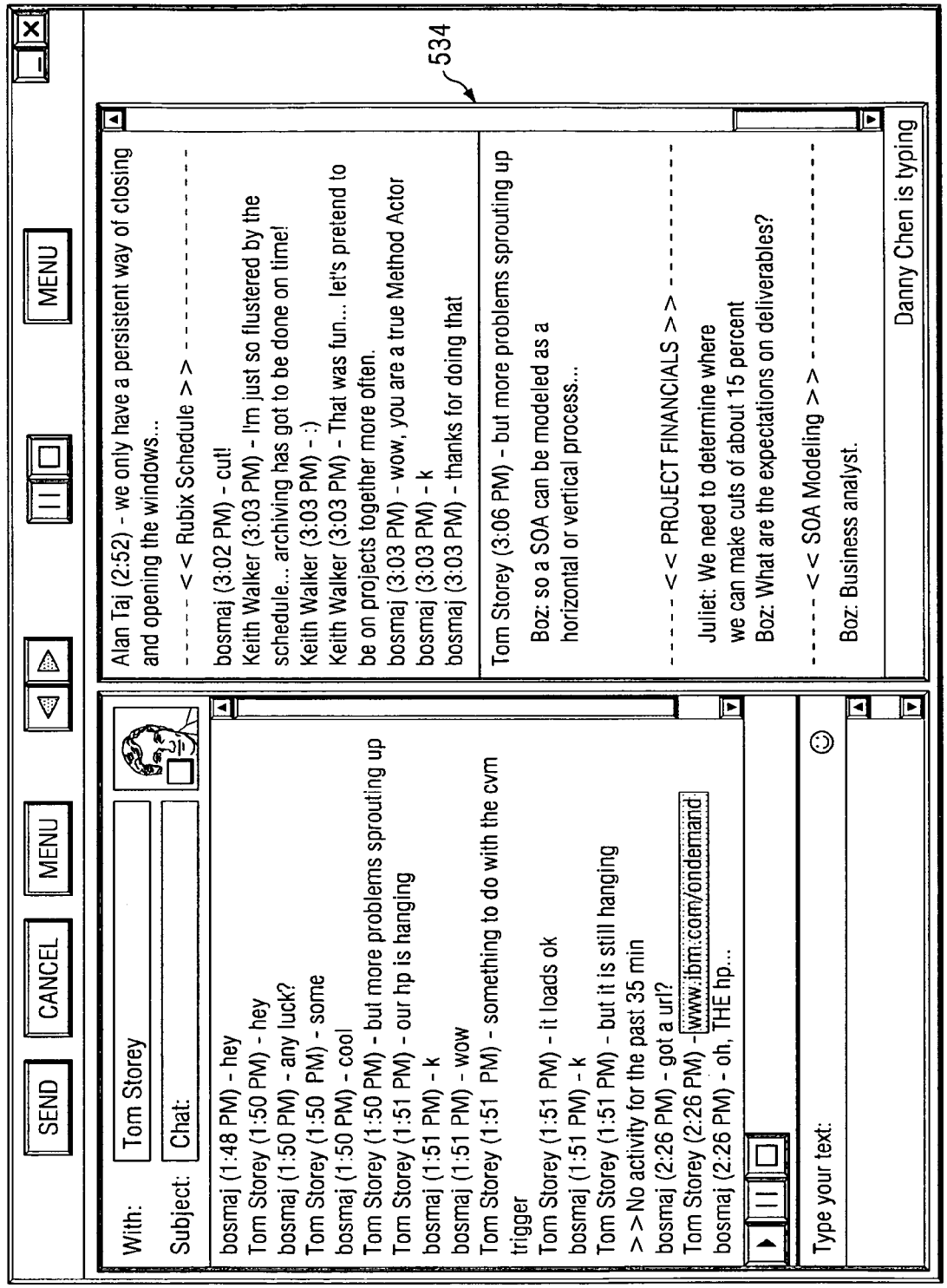
Figure 5C:
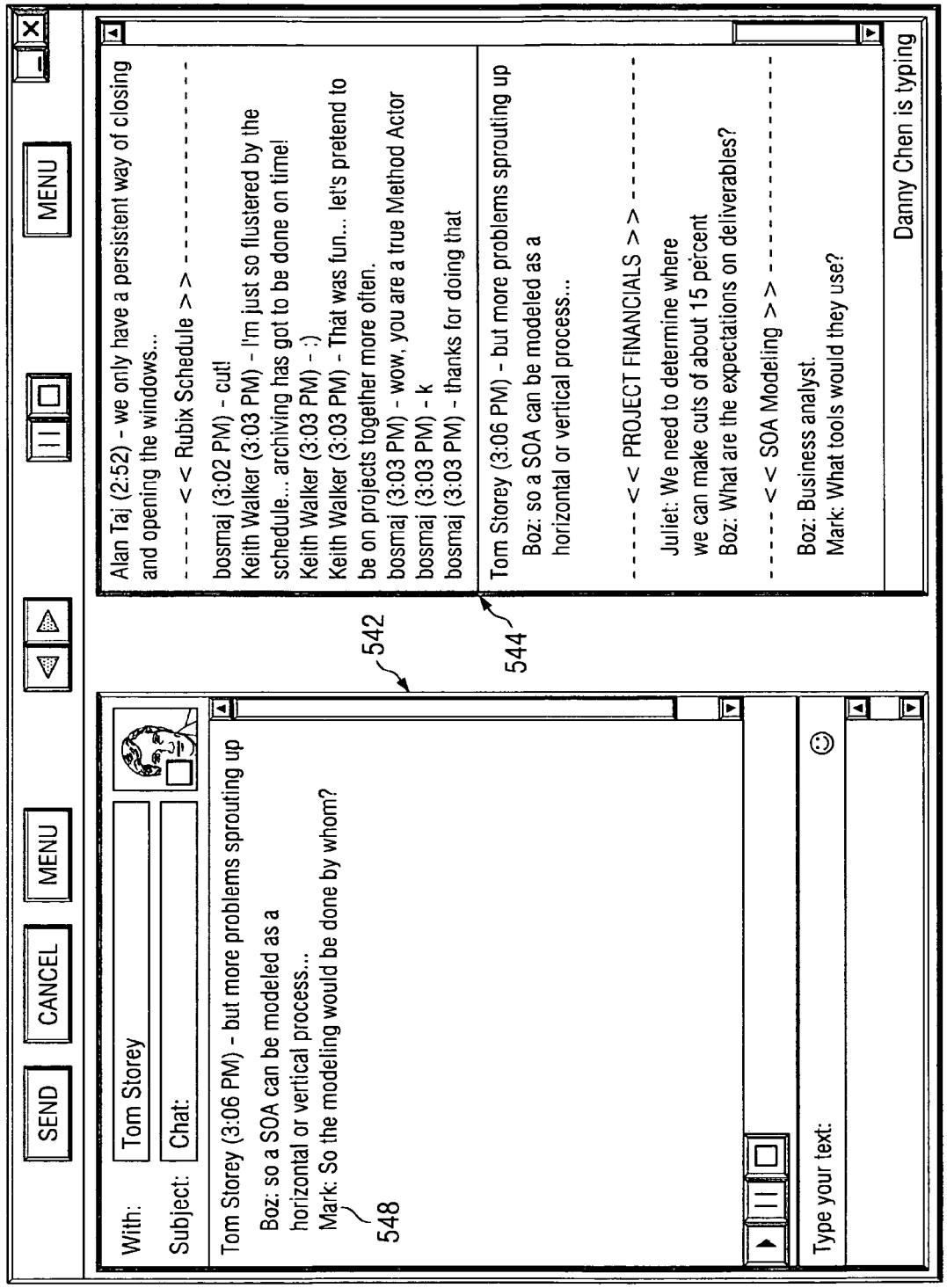

With reference now to FIG. 5A, an exemplary scrolling chat window in accordance with an illustrative embodiment of the present invention is shown docked together with main chat window 502. Main chat window 502 is an example of a dialog window, such as dialog window 404 in FIG. 4. Main chat window 502 comprises the user's current ongoing instant messaging chat. As shown in this illustrative example, the user is currently conducting a conversation with Tom Storey. The previous turns in the conversation are shown in conversation display area 504, and the user may enter text to respond to Tom Storey in dialog area 506. When composing a response, the user may select Send button 508 or execute other appropriate keystrokes to send the text entered into dialog area 506 to Tom Storey. The sent text will be displayed in conversation display area 504.

Main chat window 502 also comprises forward/backward navigation controls 512. Forward/backward navigation controls 512 allows the user to move among conversations, such as forward to the next chat or backward to the previous chat. The order of chats may be arranged in the order the user has viewed chats by default, or in an order that the user has configured. Forward/backward navigation controls 512 may be implemented using chat session identifiers associated with each chat session, as well as by logging of switches among the different conversations. Forward/backward navigation controls 512 may also be linked to configurable hot keys, so the user may switch among or cycle through conversations without having to minimize and maximize windows, go to the task bar, or engage in any activities that would remove the focus from the main or scrolling chat windows.

Scrolling chat window 514 comprises an aggregate view of the user's ongoing instant messaging chats. Scrolling chat window 514 provides the user with the ability to monitor multiple conversations simultaneously, choose which conversations to monitor and respond to, and easily switch among the ongoing conversations without having to go to the taskbar. With the scrolling chat window, users may gauge the activity level, importance, or relevance of key conversations by observing what is being said, how much is being said, who is saying it, and what the topics are, among other factors.

Scrolling chat window 514 may be implemented by logging instant messaging conversations to one or more chat transcripts. The logged content from the scrolling window may be saved as a single file or multiple files, such as in an XML format, and may contain markers for timestamp, chat session identifiers, and structures to identify users and topics and link them with a particular conversation. Users may access the chat transcript for other purposes such as completion of notes, task assignments, follow-up messaging, and the like. The transcripts may be saved in the local file system or a remote server.

Each chat session or chat speaker in scrolling chat window 514 may be visually separated from the other chat sessions or speakers in the window. Although the example shows the chat sessions segregated by chat topic, other criteria may be used to visually separate the sessions, such as using color, numbers, icons, or graphics such as a user's avatar or picture to delineate among chats and chat speakers. Scrolling chat window 514 also comprises at least one scrolling mechanism, such as scroll bar 516, up/down controls, page up/page down controls, and hot keys that allow the user to scroll through turns in the monitored conversations. These mechanisms allow the user to view chat text that has scrolled out of the user's view. The scrolling mechanisms may also comprise replay, forward, pause, and stop controls. The user may select pause control 518 to "lock" or pause the scrolling chat window in place for a time while the contents of the scrolling window are examined by the user. Likewise, the user may select stop control 520 to stop the scrolling chat window at the current display.

With scrolling chat window 514, a user may easily monitor and switch among the ongoing conversations. For instance, the user scrolls through the chats in scrolling chat window 514 using scroll bar 516 and observes a particular chat to which the user wants to reply. By clicking on the turn in the chat, the user is able to switch directly from the user's current conversation, such as the chat with Tom Storey shown in conversation display area 506 to the selected conversation, such as the chat with Project Financials conversation 526 in scrolling chat window 514. In alternative embodiment, the user may switch to another conversation by clicking on a hotspot linked to the turn. When the user clicks on the turn in the selected conversation, the selected conversation may be loaded into main chat window 502. The point of focus may be placed in main chat window 502, with the insertion point being in dialog area 506.

Users may also specify the contents to be displayed in scrolling chat window 514. For instance, a user may remove entries from scrolling chat window 514 that the user does not want displayed. Entry removal may include removing topics, participants, and conversations from the scrolling chat window. Thus, the scrolling chat window may be managed by the user as a "holding place" for some or all of the contents of active chats, rather than serving as a "transcript" for all chats. A user may specify the content to be displayed in the scrolling chat window via configuration elements provided to the user, launched either from a configuration screen or via a context-sensitive menu activated by clicking on a chat participant's icon, name, or a turn in the scrolling window.

In the illustrative example, all ongoing chats are displayed in scrolling chat window 514. The user may specify that the scrolling chat window display the content of all chats, the content of only particular chats, instant messages from all or only particular users for all chats, instant messages from all or only particular users for selected chats, instant messages pertaining to all or only particular instant messaging topics, or any combination of the above. In one example, the user may specify whether or not the user's own turns are to be displayed in the scrolling chat window. In another example, available chat topics for each chat session are displayed in the scrolling chat window. A user may specify that the chat topics are to be displayed in the scrolling chat window only when the user switches among ongoing chat sessions or chat topics. When a chat topic is displayed, subsequent turns in the chat session may be displayed in the scrolling chat window without a chat topic until the user again switches among the chat sessions.

Figure 5D:
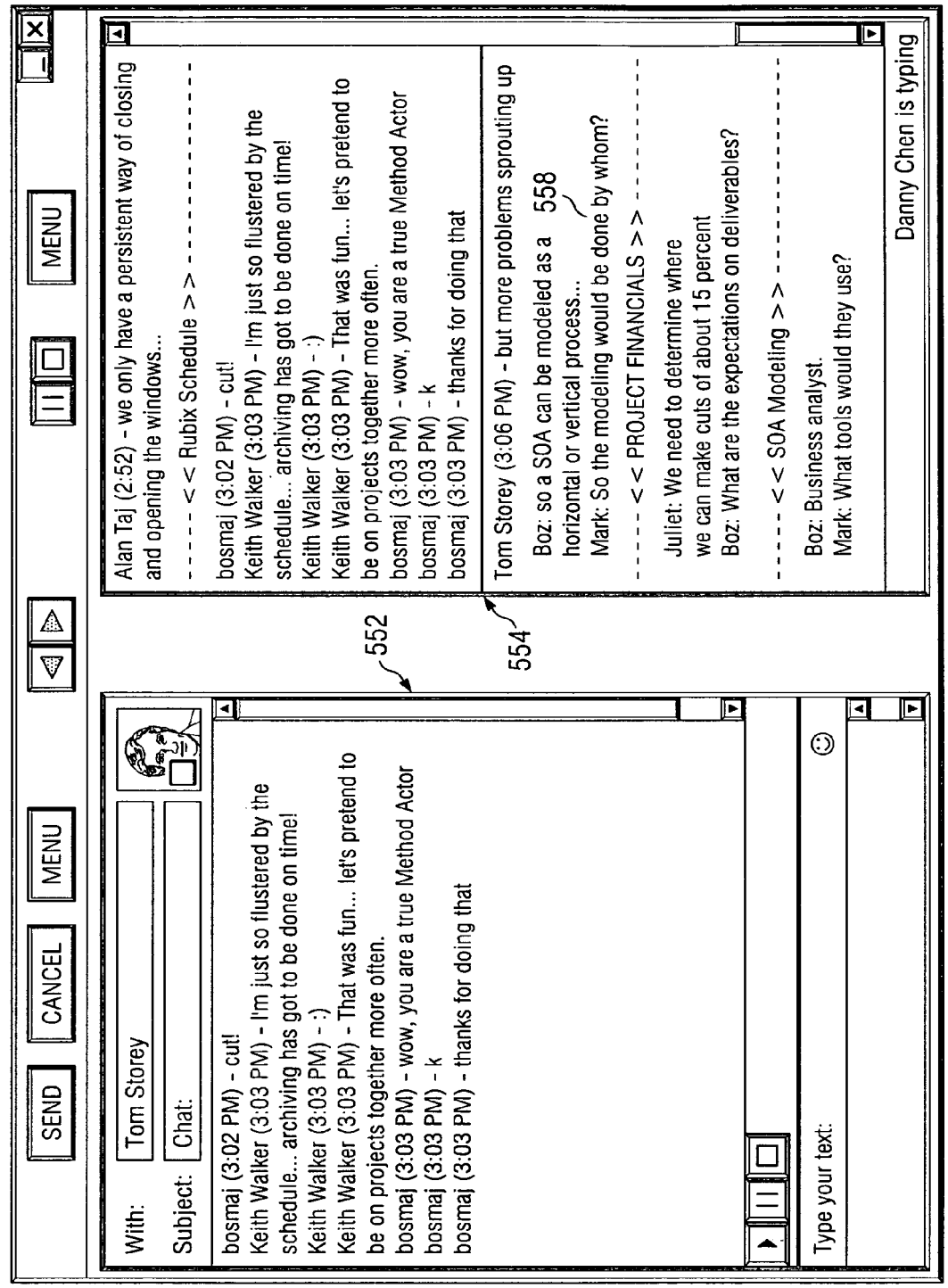

The user may also configure the content displayed in the scrolling chat window. For example, when the user selects a particular person, Mark 528, in the scrolling chat window, the user may remove all entries in the scrolling chat window containing turns from Mark 528, such as shown in scrolling chat window 534 in FIG. 5B. In a second embodiment in FIG. 5C, when the user is actively participating in a given conversation in main chat window 542, in this case a conversation with Mark 548, the user may select not to display in scrolling chat window 544 the incoming turns from Mark 548 for only the given conversation in main chat window 542. When the user switches to a second chat which is subsequently displayed in main chat window 552 as shown in FIG. 5D, the first chat with Mark 558 may again be logged to and displayed showing the incoming turns with Mark 558 in scrolling chat window 554.

The removal of entries such as topics, participants, and conversations from the scrolling chat window may be performed in one embodiment by rewriting the contents of the scrolling chat window each time the user specifies that an entry should be removed from the scrolling chat window view. In another embodiment, the removal of entries may be implemented by dynamically accessing an XML Document Object Model to add, remove, or hide elements from the scrolling chat window display.

Figure 6A:
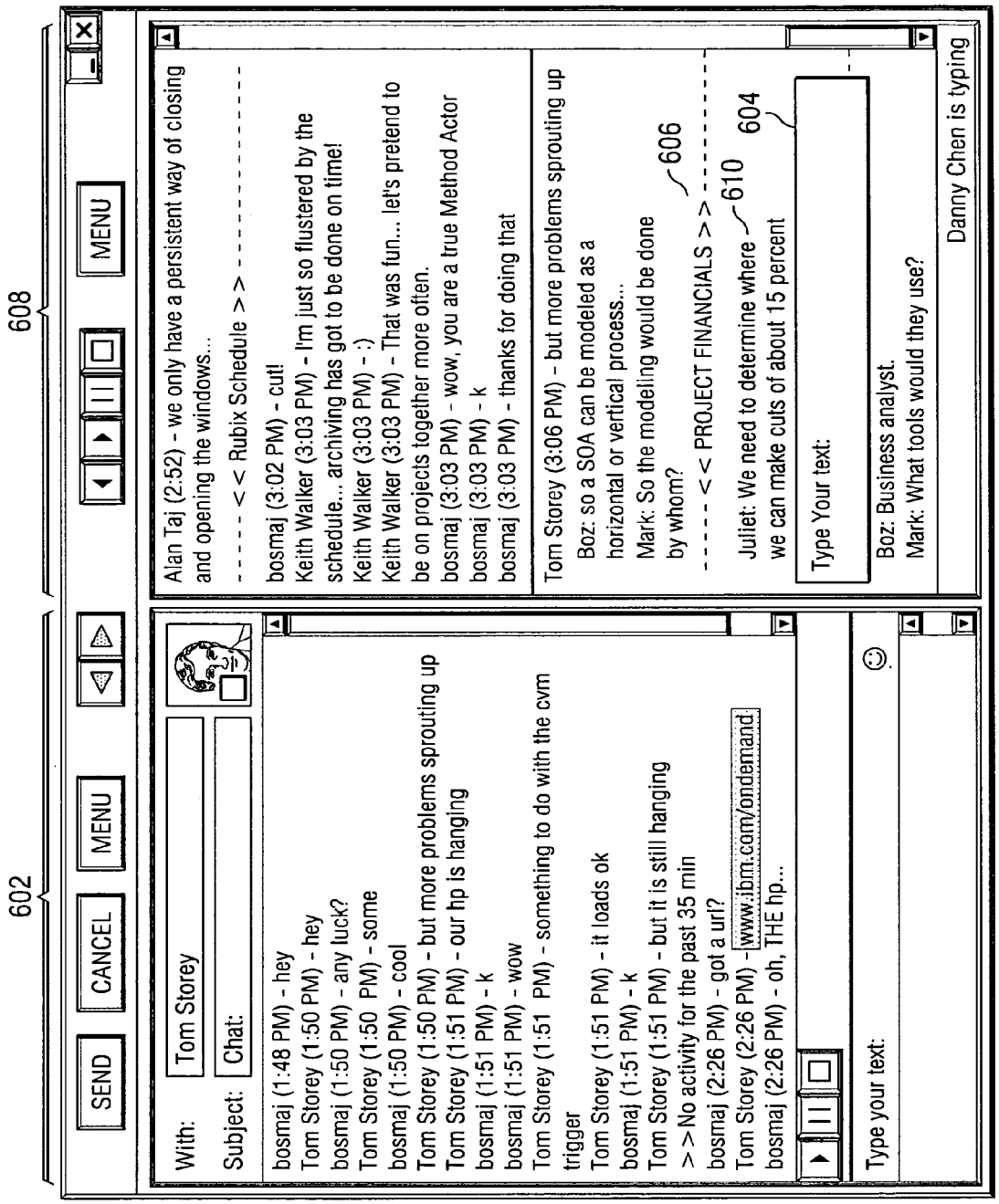
FIGS. 6A-6B illustrate exemplary mini-windows in accordance with the illustrative embodiments of the present invention.
Figure 6B:
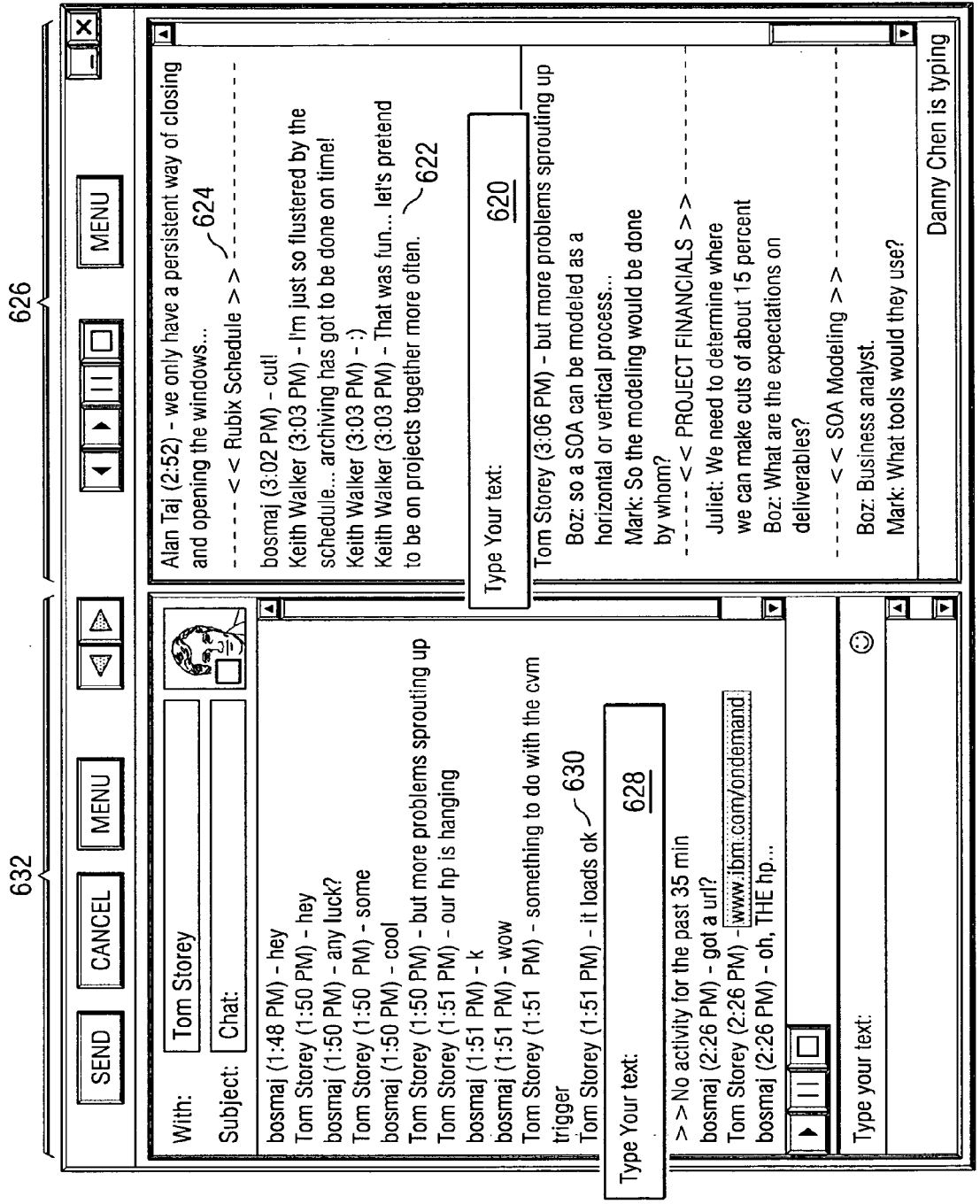

FIGS. 6A-6B illustrate exemplary mini-windows in accordance with the illustrative embodiments of the present invention. The mini-window enables a user to send a quick response to a chat turn without loading the entire chat conversation into the main chat window. A user may respond to a chat conversation by clicking on the turn to open a "mini-window" directly over the turn. In FIG. 6A, the user does not have to move to the main chat window in order to type a quick message, and the chat conversation selected by the user is not loaded into main chat window 602. Instead, mini-window 604 may pop up over the turn the user has selected. For example, if the user is monitoring Project Financials conversation 606 in scrolling chat window 608 and wants to send a quick response to Juliet's turn 610, the user may click on Juliet's turn. Mini-window 604 pops up over the turn, and the user's keyboard focus is placed in the mini-window. The user enters text into the mini-window, and sends the text to the participants of the chat conversation. The text may be sent by selecting a "send" button in the mini-window or using appropriate keystrokes, such as hitting the Enter key on the keyboard, to send the text. When the mini-window is initiated, options may also be provided to the user to allow the user to send a quick response, such as provided canned responses selectable by the user, such as "Yes" or "No". In this manner, the user does not need to type text into the mini-window, but rather may select a canned response to quickly provide a response to a chat turn.

A user may also open a mini-window in response to selecting a turn in the main chat window. In addition, multiple mini-windows may be maintained at one time. For example, in FIG. 6B, the user is shown to have initiated mini-window 620 to respond to Keith Walker's turn 622 in Rubix Schedule conversation 624 in scrolling window 626, and mini-window 628 to response to Tom Storey's turn 630 in main chat window 632. Thus, the user is allowed to quickly respond to a chat conversation regardless of whether the chat conversation the user wants to respond to is located in main chat window 632 or scrolling chat window 626. The user's keyboard focus is placed in one of the open mini-windows, and the user may quickly and directly respond to the selected turn. The user may switch among the multiple open mini-windows.

The user may also initiate a private message or a separate conversation with the mini-window. The private or separate message may be sent to the participant of the turn selected by the user, rather than sending the private or separate message to all participants in the particular chat conversation. Selectable options may be provided to the user to allow the user when the user selects a particular chat conversation to distinguish whether the user wants to open a mini-window to quickly respond to a chat conversation, open a mini-window to create a private message, or load the selected chat conversation into the main chat window.

Figure 7:
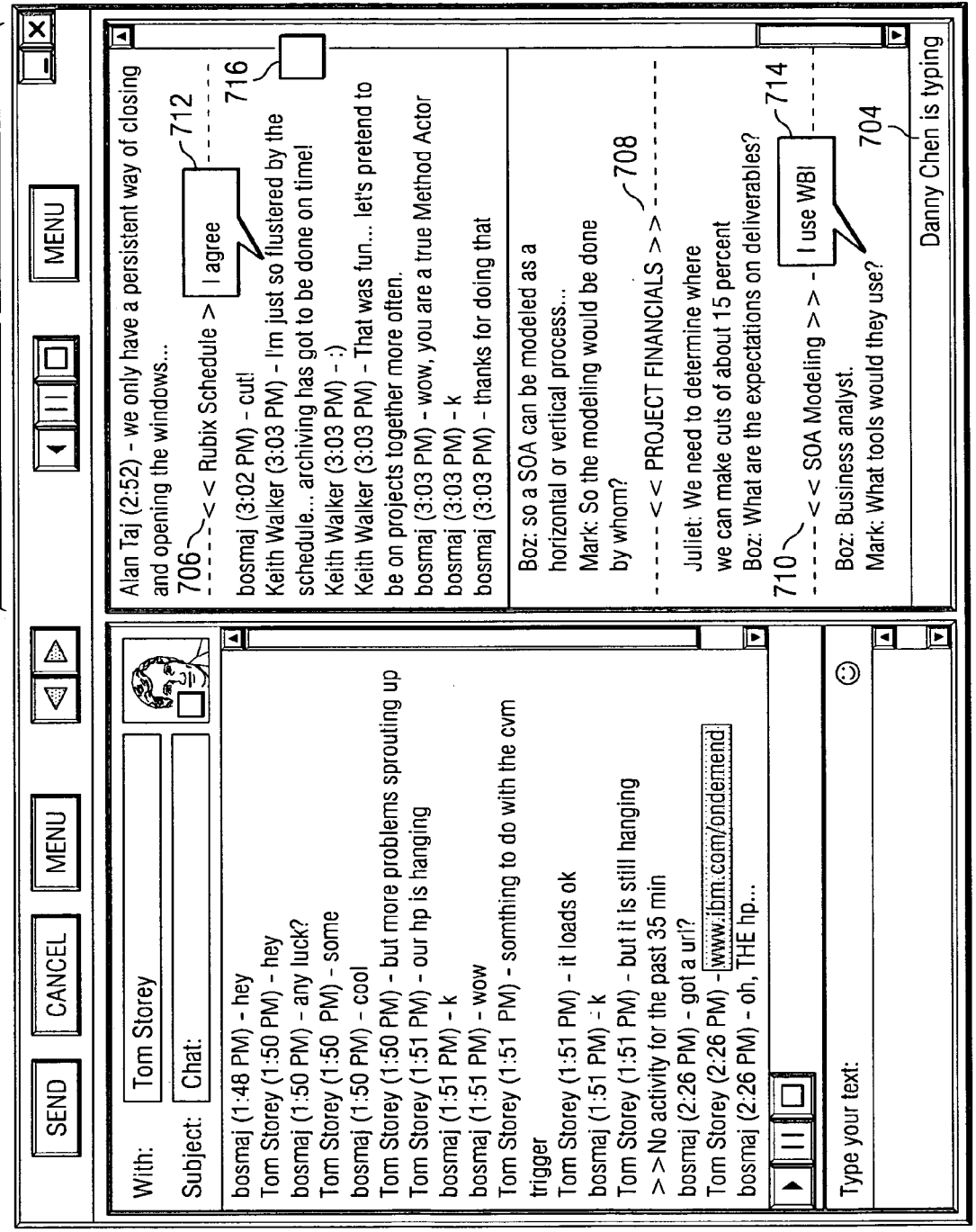
FIG. 7 illustrate exemplary in-context responses in accordance with the illustrative embodiments of the present invention.

FIG. 7 illustrate exemplary in-context responses in accordance with the illustrative embodiments of the present invention. As shown in scrolling chat window 702, the user in this case, Danny Chen 704, has multiple instant messaging conversations ongoing, including Rubix Schedule conversation 706, Project Financials conversation 708, and SOA modeling conversation 710, among others. As the user monitors Rubix schedule conversation 706, the user may want to respond to a turn in the conversation. For example, the user may want to respond to Keith Walker's comment stating "I'm just so flustered by the schedule . . . archiving has got to be done on time!" If the user wants to respond to the comment, the user may select the particular turn, select an option to link the user's response to the selected turn, and then input a response to the turn. In this example, the user has entered, "I agree". In a similar manner, the user has responded to Mark's comment "What tools would they use" in SOA Modeling conversation 710 with the linked in-context response, "I use WBI".

The content of the in-context response may be displayed to the user, as shown by response boxes 712 and 714. A response box may include a popup window or a designated area of an existing window for receiving the user's in-context response. Response boxes 712 and 714 may also be shown temporarily, and then reduced to a visual indicator, such as response note 716. Response note 716 may include a minimized visual indicator that is visually linked to the particular turn, such as a callout box or sticky note. In this manner, when the dialog of the conversation is displayed, response note 716 may alert the user that there is a response to a particular turn in the conversation. When the user selects response note 716, the content of the linked response is displayed to the user, such as in response boxes 712 or 714.

As previously mentioned, the logged chat content from the scrolling window may be saved in an XML format. The chat content may also include additional metadata that is used to indicate links between conversation turns and in-context responses, and thus to which comment a response applies.

Although the callout box aspect of the present invention is shown implemented in the scrolling chat window, it should be noted that the callout box of the present invention may be implemented in any instant messaging chat window, wherein the chat window comprises one or more instant messaging chat conversations.

Figure 8:
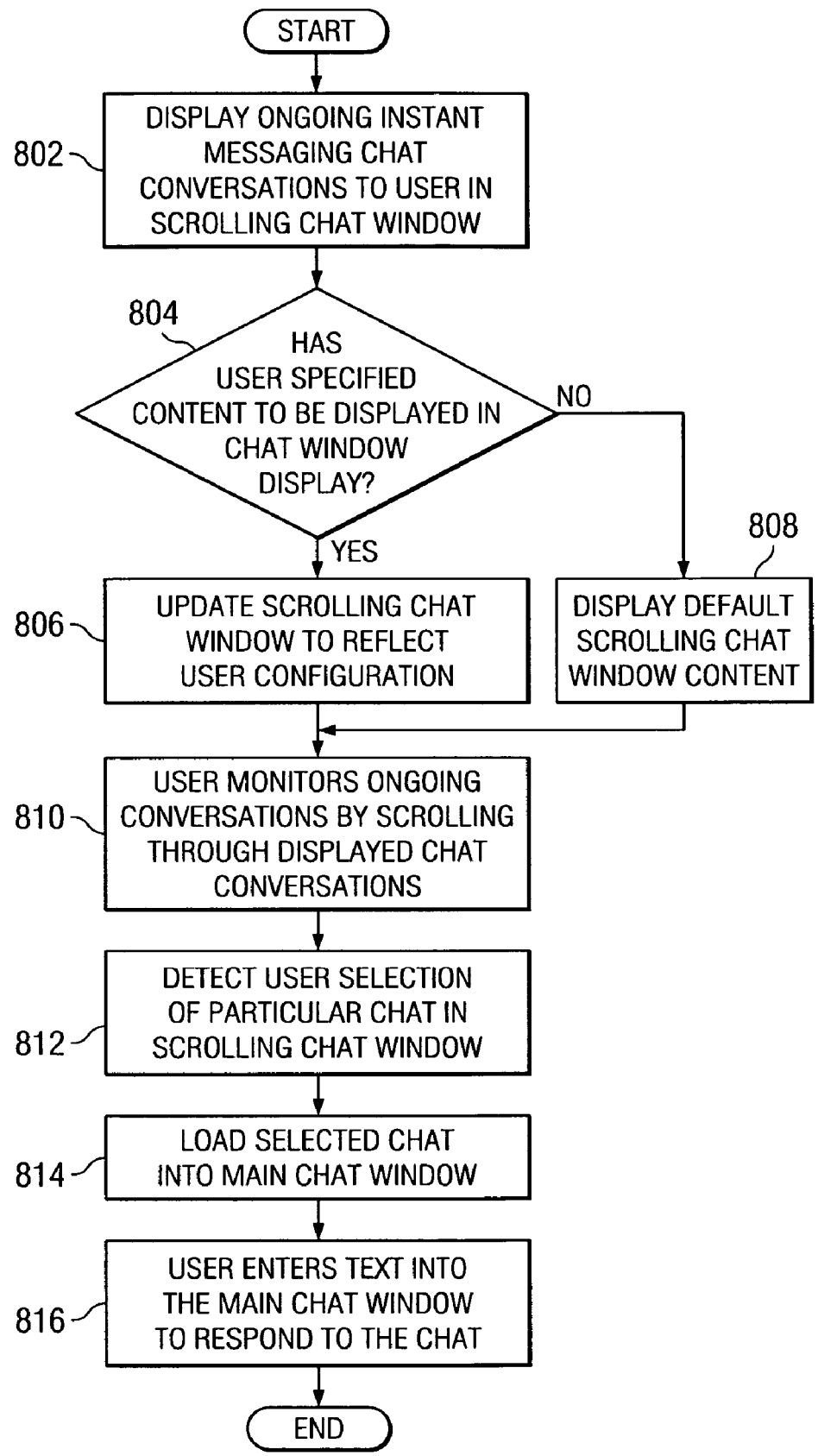
FIG. 8 is a flowchart of a process for configuring and monitoring instant messaging chats in an instant messaging aggregate display in accordance with an illustrative embodiment of the present invention.

FIG. 8 is a flowchart of a process for configuring and monitoring instant messaging chats in an aggregate instant messaging display in accordance with an illustrative embodiment of the present invention. The process illustrated in FIG. 8 may be implemented in an instant messaging application, such as instant messaging application 400 in FIG. 4.

The process begins with displaying all ongoing instant messaging chat conversations to a user in a scrolling chat window (step 802). The content of each instant messaging chat is placed in a single file chat transcript, such as an XML document. The XML document comprises identifiers linking the entry with a particular chat and/or chat speaker. In one embodiment, the scrolling chat window may be docked to a main chat window, which contains text and type entered by the user for the user's active conversation.

Next, a determination is made as to whether the user has specified the content to be displayed in the scrolling chat window display (step 804). For example, the user may configure the scrolling chat window to display all chat conversations or only particular chat conversations or responses from particular chat speakers. If the user specifies particular content to be displayed, the scrolling chat window is updated to reflect the user configuration (step 806). If the user does not specify the content to be displayed in the scrolling chat window, then a "default" scrolling chat window display (such as displaying all chat sessions) is displayed in the scrolling chat window (step 808).

The user monitors the plurality of ongoing conversations in the scrolling chat window by scrolling through the displayed chat conversations (step 810). A user may scroll through the chat conversations by clicking and dragging the slider in the scroll bar, selecting the up/down buttons on the keyboard, selecting the page up/page down buttons on the keyboard, and the like. As the user scrolls through the conversations, the mechanism of the present invention may detect that the user has switched to a particular chat when the user selects a particular chat conversation in the scrolling chat window (step 812). The user may select a chat conversations by clicking on a turn in the chat conversations or a hotspot or similar device linked to the chat conversations.

The selected chat is then loaded and displayed in the main chat window (step 814). The user's keyboard focus is placed in the main chat window, such that the user may enter text to respond to the chat (step 816). The user may continue to monitor the conversations in the scrolling chat window and switch among the chat conversations as described above.

Figure 9:
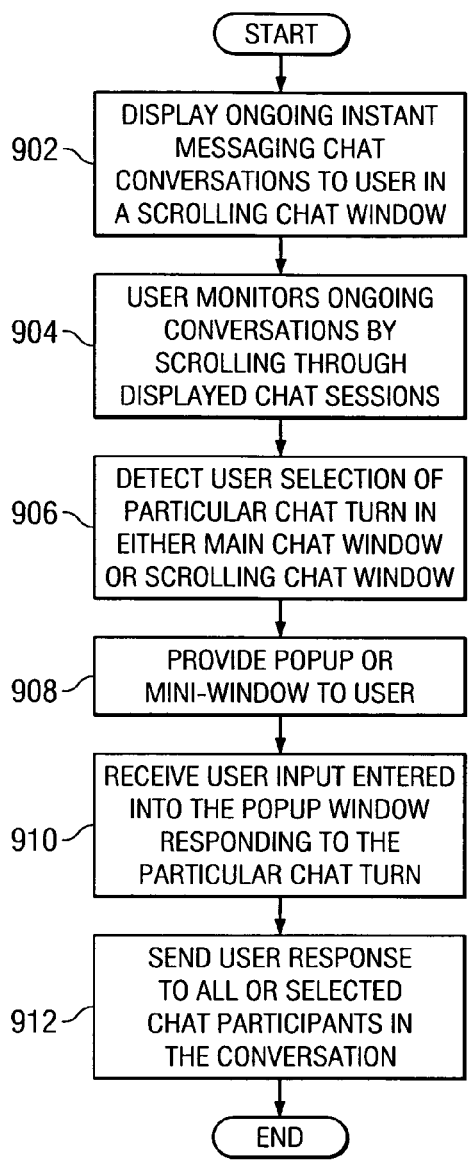
FIG. 9 is a flowchart of a process for quickly responding to an instant messaging chat conversation using a mini-window in accordance with an illustrative embodiment of the present invention.

FIG. 9 is a flowchart of a process for quickly responding to an instant messaging chat conversation using a mini-window in accordance with an illustrative embodiment of the present invention. The process illustrated in FIG. 9 may be implemented in an instant messaging application, such as instant messaging application 400 in FIG. 4.

The process begins with displaying a set of ongoing instant messaging chat conversations to a user in a scrolling chat window (step 902). A set of ongoing instant messaging chat conversations may comprise one or more instant messaging chat conversations. The content of each instant messaging chat is placed in a single file chat transcript, such as an XML document, comprising identifiers linking the entry with a particular chat and/or chat speaker. The scrolling chat window may be docked to a main chat window, which contains text and type entered by the user for the user's active conversation.

The user may monitor chat conversations in the scrolling chat window by scrolling through the displayed chat conversations (step 904). As the user scrolls through the conversations, the mechanism of the present invention may detect that the user wants to respond to a particular chat turn when the user selects the particular chat turn in either the main chat window or the scrolling chat window (step 906). The user may select a chat turn to respond to by clicking on the turn or similar device linked to the chat turn.

When the user selects a particular chat turn, a user input region, such as a popup window, mini-window, or designated area of a window, is provided to the user (step 908). The user input region allows the user to quickly and directly respond to the turn, without requiring the corresponding chat conversation to be loaded and displayed in the main chat window. The user may then respond to the turn by entering a message into the user input region (step 910). The message in the user input region may be sent to a set of chat participants (step 912). A set of chat participants may include one or more chat participants in the conversation, such as all of the chat participants or the particular chat participant of the selected turn. The user may continue to monitor the conversations in the scrolling chat window, and switch among the chats and user input regions as described above.

Figure 10:
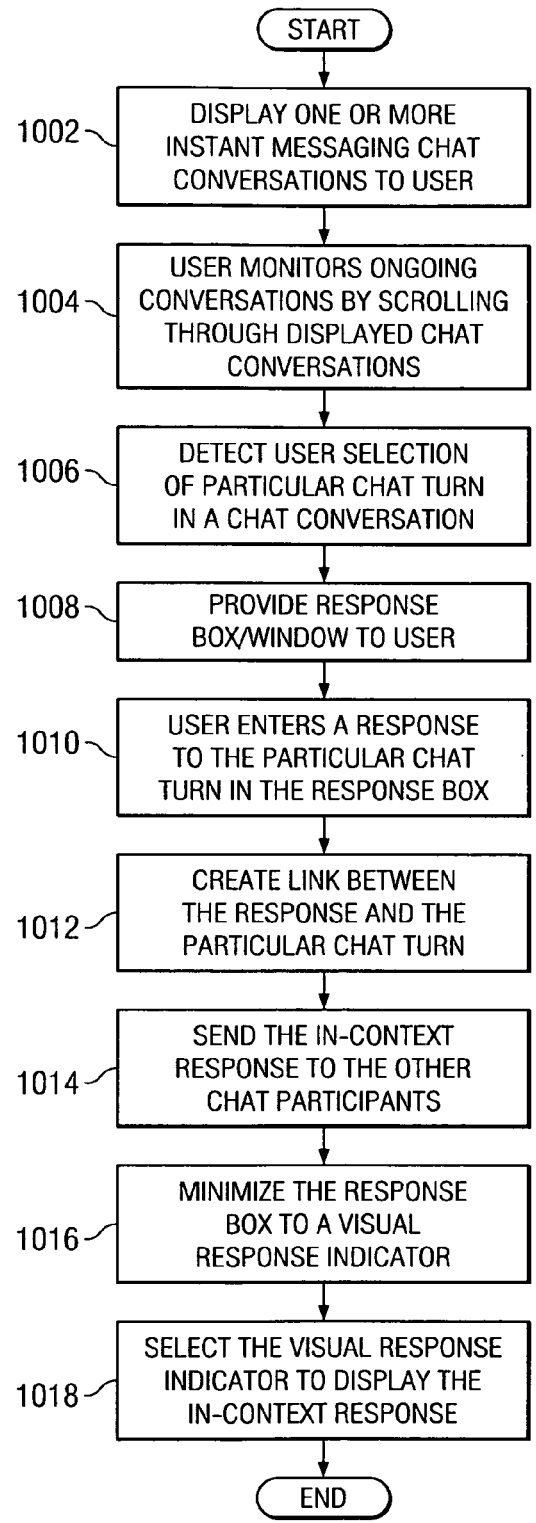
FIG. 10 is a flowchart of a process for linking an instant messaging chat response to a particular turn in a chat conversation in accordance with an illustrative embodiment of the present invention.

FIG. 10 is a flowchart of a process for linking an instant messaging chat response to a particular turn in a chat conversation in accordance with an illustrative embodiment of the present invention. The process illustrated in FIG. 10 may be implemented in an instant messaging application, such as instant messaging application 400 in FIG. 4.

The process begins with displaying a set of instant messaging chat conversations to a user (step 1002). A set of ongoing instant messaging chat conversations may comprise one or more instant messaging chat conversations. The content of each instant messaging chat may be placed in a single file chat transcript, such as an XML document. The XML document may comprises identifiers linking the entry with a particular chat and/or chat speaker.

The user monitors the multiple ongoing conversations in the scrolling chat window by scrolling through the displayed chat conversations (step 1004). As the user scrolls through the conversations, the mechanism of the present invention may detect that the user has selected a particular turn in a chat conversation (step 1006). The user may select a turn clicking on a turn in the chat conversation or a hotspot or similar device linked to the chat conversation.

When the user selects a particular chat turn, a response input area, such as a response box or window, is provided to the user to respond to the turn (step 1008). The response input area allows the user to enter a response in context (step 1010). By selecting the turn, the response the user enters into the response input area is linked to the particular turn (step 1012). The response may be linked to the particular turn by updating the XML document containing a transcript of the chat conversation. Identifiers in the XML document may be updated to reflect the link between the selected chat turn and the response. The user may then send the in-context response to a set of chat participants by clicking on a Send button or hitting the appropriate keystrokes (step 1014). A set of chat participants may include one or more chat participants in the conversation, such as all of the chat participants or the particular chat participant of the selected turn.

At any time after the in-context response is sent, the response input area may be minimized to a visual response indicator, such as a callout box or a sticky note, after a certain predefined or configured time period (step 1016). The visual response indicator may be placed in proximity to the turn to which the response applies, such that a user will be notified that the particular turn has an associated response. When the visual response indicator is selected, such as by clicking on the visual response indicator, the content of the response is displayed to the user (step 1018).

Thus, the present invention provides a scrolling chat window comprising an aggregate view of instant messaging chats. An advantage is provided over current instant messaging systems by providing users with the ability to monitor the ongoing chat conversations and quickly switch among the conversations as needed. In addition, users are able to respond quickly and easily to some or all of those conversations, while minimizing the impact on the users' other activities. Users are also provided with the ability to configure the content displayed in the scrolling chat window, such that the users may choose which instant messaging conversations to monitor and which responses from particular people or topics to display.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), and digital video disc (DVD).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for enabling a user to generate a quick response to an instant messaging chat conversation, the computer implemented method comprising:
    displaying a set of instant messaging chat conversations to a user in a scrolling chat window adjacent to a main chat window comprising an active instant messaging conversation of the user;
    receiving user input selecting a chat turn in the set of instant messaging conversations in the scrolling chat window to form a selected chat turn;
    responsive to receiving the user input selecting a chat turn in the scrolling chat window, providing a user input region to the user without loading the selected chat turn into the main chat window, wherein the user input region is used to receive an instant message from the user;
    creating a link between the user input region and an identifier of the selected chat turn in an extensible markup language document associated with the selected chat turn; and
    responsive to the user entering an instant message into the user input region, sending the instant message to all participants in the selected chat turn.

2. The computer implemented method of claim 1, wherein the user selects a chat turn to respond to by clicking on a hotspot linked to the chat turn.

3. The computer implemented method of claim 1, wherein the user input region is placed over the selected turn.

4. The computer implemented method of claim 1, wherein the instant message is a canned response.

5. A data processing system for enabling a user to generate a quick response to an instant messaging chat conversation, the data processing system comprising:
    a bus;
    a storage device connected to the bus, wherein the storage device contains computer usable code;
    at least one managed device connected to the bus;
    a communications unit connected to the bus;
    a processing unit connected to the bus, wherein the processing unit executes the computer usable code to display a set of instant messaging chat conversations to a user in a scrolling chat window adjacent to a main chat window comprising an active instant messaging conversation of the user; receive user input selecting a chat turn in the set of instant messaging conversations to form a selected chat turn; provide a user input region to the user without loading the chat turn into the main chat window in response to receiving the user input selecting a chat turn in the scrolling chat window, wherein the user input region is used to receive an instant message from the user; create a link between the user input region and an identifier of the selected chat turn in an extensible markup language document associated with the selected chat turn; and send the instant message to all participants in the selected chat turn in response to the user entering an instant message into the user input region.

6. The data processing system of claim 5, wherein the user selects a chat turn to respond to by clicking on a hotspot linked to the chat turn.

7. The data processing system of claim 5, wherein the user input region is placed over the selected turn.

8. The data processing system of claim 5, wherein the instant message is sent to the one or more participants by one of selecting a send button or hitting an enter key.

9. The data processing system of claim 5, wherein the instant message is a canned response.

10. A computer program product for enabling a user to generate a quick response to an instant messaging chat conversation, the computer program product comprising:
    a computer readable storage medium having computer usable program code stored thereon, the computer usable program code comprising:
    computer usable program code for displaying a set of instant messaging chat conversations to a user in a scrolling chat window adjacent to a main chat window comprising an active instant messaging conversation of the user;
    computer usable program code for receiving user input selecting a chat turn in the set of instant messaging conversations in the scrolling chat window to form a selected chat turn;
    computer usable program code for providing a user input region to the user without loading the selected chat turn into the main chat window in response to receiving the user input selecting a chat turn in the scrolling chat window, wherein the user input region is used to receive an instant message from the user;
    computer usable program code for creating a link between the user input region and an identifier of the selected chat turn in an extensible markup language document associated with the selected chat turn; and
    computer usable program code for sending the instant message to all participants in the selected chat turn in response to the user entering an instant message into the user input region.

11. The computer program product of claim 10, wherein the user selects a chat turn to respond to by clicking on a hotspot linked to the chat turn.

12. The computer program product of claim 10, wherein the user input region is placed over the selected turn.

13. The computer implemented method of claim 1, wherein the instant messaging chat conversations in the scrolling chat window are visually separated based on avatars or pictures of the participants.

14. The computer implemented method of claim 1, wherein the scrolling chat window comprises replay, forward, pause, and stop controls for scrolling through the instant messaging conversations.

15. The computer implemented method of claim 1, wherein instant messaging conversations are displayed in the scrolling chat window only upon detecting the user is switching chat sessions in the main chat window.

16. The computer implemented method of claim 1, further comprising:
    removing entries in an instant messaging chat conversation that associated with a subset of participants in the instant messaging chat conversation from display in the scrolling chat window.

17. The computer implemented method of claim 16, wherein contents of the scrolling chat window are rewritten each time a user request is received to remove an entry from display in the scrolling chat window.

* * * * *

UNITED STATES PATENT AND TRADEMARK OFFICE
CERTIFICATE OF CORRECTION

PATENT NO. : 7,661,067 B2  Page 1 of 1
APPLICATION NO. : 11/358754
DATED : February 9, 2010
INVENTOR(S) : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 992 days.

Signed and Sealed this

Thirtieth Day of November, 2010

David J. Kappos
*Director of the United States Patent and Trademark Office*